(12) United States Patent
Egeberg et al.

(10) Patent No.: US 10,752,842 B2
(45) Date of Patent: Aug. 25, 2020

(54) DEMETALLIZATION OF HYDROCARBONS

(71) Applicant: HALDOR TOPSØE A/S, Kgs. Lyngby (DK)

(72) Inventors: Rasmus Gottschalck Egeberg, Fredensborg (DK); Angelica Hidalgo Vivas, Herlev (DK); Søren Selde Enevoldsen, Fredensborg (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 230 days.

(21) Appl. No.: 15/579,495

(22) PCT Filed: Jun. 30, 2016

(86) PCT No.: PCT/EP2016/065251
§ 371 (c)(1),
(2) Date: Dec. 4, 2017

(87) PCT Pub. No.: WO2017/001539
PCT Pub. Date: Jan. 5, 2017

(65) Prior Publication Data
US 2018/0148652 A1 May 31, 2018

(30) Foreign Application Priority Data

Jul. 2, 2015 (DK) .................................. 2015 70431
Jul. 3, 2015 (EP) ..................................... 15175295
(Continued)

(51) Int. Cl.
*C10C 1/20* (2006.01)
*C10G 31/10* (2006.01)
(Continued)

(52) U.S. Cl.
CPC .............. *C10C 1/205* (2013.01); *C10B 53/00* (2013.01); *C10C 1/20* (2013.01); *C10G 3/42* (2013.01);
(Continued)

(58) Field of Classification Search
CPC ........... C10C 1/205; C10C 1/20; C10G 17/06; C10G 3/50; C10G 3/42; C10G 67/08;
(Continued)

(56) References Cited

U.S. PATENT DOCUMENTS 3,622,505 A 11/1971 Tilley et al.
4,173,529 A * 11/1979 Bauer .................... C10G 45/32
208/255

(Continued)

FOREIGN PATENT DOCUMENTS

CN 1055552 A 10/1991
CN 104379544 A 2/2015

OTHER PUBLICATIONS

International Search Report (PCT/ISA/210) dated Sep. 21, 2016, by the European Patent Office as the International Searching Authority for International Application No. PCT/EP2016/065251.
(Continued)

*Primary Examiner* — Randy Boyer
*Assistant Examiner* — Juan C Valencia
(74) *Attorney, Agent, or Firm* — Buchanan Ingersoll & Rooney P.C.

(57) ABSTRACT

The present disclosure refers to a process and a process plant for extraction of metals from a hydrocarbon mixture obtained from a gasification or pyrolysis process, comprising the steps of combining said hydrocarbon mixture with an aqueous acid forming a mixture, mixing said mixture, separating said mixture in a contaminated aqueous phase and a purified hydrocarbon phase, with the associated benefit of
(Continued)

said aqueous acid being able to release metals bound in such gasification and pyrolysis processes.

19 Claims, 6 Drawing Sheets

(30) Foreign Application Priority Data

May 31, 2016 (CN) .......................... 2016 1 0377969
May 31, 2016 (CN) .................... 2016 2 0517942 U
May 31, 2016 (DK) ................................ 2016 70387

(51) Int. Cl.
| | | |
|---|---|---|
| *C10G 32/02* | (2006.01) | |
| *C10G 45/02* | (2006.01) | |
| *C10G 45/32* | (2006.01) | |
| *C10G 67/08* | (2006.01) | |
| *C10K 1/00* | (2006.01) | |
| *C10G 3/00* | (2006.01) | |
| *C10G 17/06* | (2006.01) | |
| *C10B 53/00* | (2006.01) | |
| *C10J 3/00* | (2006.01) | |

(52) U.S. Cl.
CPC .............. *C10G 3/50* (2013.01); *C10G 17/06* (2013.01); *C10G 31/10* (2013.01); *C10G 32/02* (2013.01); *C10G 45/02* (2013.01); *C10G 45/32* (2013.01); *C10G 67/08* (2013.01); *C10J 3/00* (2013.01); *C10K 1/004* (2013.01); *C10G 2300/203* (2013.01); *Y02P 30/20* (2015.11)

(58) Field of Classification Search
CPC ........ C10G 45/32; C10G 45/02; C10G 32/02; C10G 31/10; C10G 2300/203; C10G 2300/205; C10G 67/14; C10K 1/004; Y02P 30/20; C10B 53/00; C10J 3/00
See application file for complete search history.

(56) References Cited

U.S. PATENT DOCUMENTS

| | | | |
|---|---|---|---|
| 4,522,702 A * | 6/1985 | Kukes | .................... C10G 17/04 208/211 |
| 4,552,646 A | 11/1985 | Stapp | |
| 2008/0035528 A1 | 2/2008 | Marker | |
| 2012/0137571 A1 | 6/2012 | Brady et al. | |
| 2013/0338410 A1 | 12/2013 | Wang et al. | |
| 2015/0136652 A1 * | 5/2015 | Bricker | .................. C10G 45/02 208/400 |

OTHER PUBLICATIONS

Written Opinion (PCT/ISA/237) dated Sep. 21, 2016, by the European Patent Office as the International Searching Authority for International Application No. PCT/EP2016/065251.
English translation of the Office Action dated Sep. 8, 2017, by the Taiwan Intellectual Property Office for the corresponding Taiwanese Patent Application No. 105120918.
Extended European Search Report dated Dec. 7, 2015, by the European Patent Office for the priority European Patent Application No. 15175295.3.
Office Action (Text of the First Office Action) dated Nov. 3, 2017, by the State Intellectual Property Office of the People's Republic of China in corresponding Chinese Patent Application No. 201610516029. 4, and an English Translation of the Office Action. (16 pages).
CN-UTM2 First Office Action Report dated Dec. 22, 2017, in corresponding Chinese Patent Application No. 201620690914.4, (2 Pages).
Office Action (Text of the Second Office Action) dated Jun. 6, 2018, by the State Intellectual Property Office of the Peoples's Republic of China in corresponding Chinese Patent Application No. 201610516029.4, and an English Translation of the Office Action. (17 pages).

* cited by examiner

DEMETALLIZATION OF HYDROCARBONS

In the processing of hydrocarbon mixtures the removal of heteroatoms is an important step for the product to comply with specifications and to avoid environmental or operational challenges. Hydrotreating is a common way of withdrawing the heteroatoms e.g. sulfur, nitrogen and oxygen, from the hydrocarbon mixture by reacting them with hydrogen. However, if metal contaminants are present, even at relatively low concentrations, the activity of the catalysts can be severely affected. The metal contaminants may result in solid products, e.g., coke or gum, being formed on the catalytic surface with the effect of deactivating the hydrotreating catalyst. Therefore, in the hydroprocessing of feeds with metal content, a so-called guard bed is necessary upstream the hydrotreating step. The guard is characterized by a high metal capture capacity, such that the sequestered metals are simply captured on the catalytic surfaces. Notwithstanding the high metal capacity, the catalytic particles must be exchanged at regular intervals, which is related to a significant cost from stopping or reducing the throughput to the plant and from replacing the catalytically active material. A swing configuration of guard beds, in which one guard bed is blocked for replacement of catalytically active material, while the other is in operation will avoid the problem of plant shut down, however, it is related to other costs.

The amount of metals in hydrocarbon mixtures vary from a few parts per million to thousands of ppm. Especially fats and oils of renewable origin, pyrolysis oil and coke oven tar may have very high levels. These feedstocks are further characterized by comprising oxygen-containing compounds, such as phenols, naphthenols, cresols, and naphthenic acids. When the metals are bound in such structures, it has surprisingly been found that large amounts of the metals may be released by contacting the hydrocarbon mixtures with aqueous acid solutions. It has furthermore been identified that an integrated process plant may be configured, in which sulfuric acid is produced from byproducts in gas cleaning process step(s), which may be used in an acid wash demetallization process.

Acid number is an indicator of the organic acidity of a stream. ASTM D664 defines acid number as the quantity of a specified base, expressed in milligrams of potassium hydroxide per gram of sample, required to titrate a sample in a specified solvent to a specified endpoint using a specified detection system.

In accordance with the use of the term in the field of refinery processes, "hydrocarbon mixture" shall comprise any stream dominated by hydrocarbons, but comprising other elements than hydrogen and carbon, such as oxygen, sulfur, nitrogen, halides and metals.

As used herein the term two phase mixture shall comprises a mixture which will separate into two phases, but it shall also comprise emulsions and other examples of two (or more) components which are interdispersed microscopically even if such a mixture is stable on the macroscopic level.

Where two phases are mentioned, this may mean one polar phase and one non-polar, but two phases shall also be read as encompassing at least two phases, e.g. a heavy non-polar phase having a density higher than an aqueous phase, the aqueous phase and a light non-polar phase having a density lower than the aqueous phase.

As used herein pyrolysis and gasification shall be understood as a process in which a carbonaceous feedstock, such as coal or biomass, is heated either in the absence of oxygen, or in the presence of sub-stoichiometric amounts of oxygen with respect to oxidation to $CO_2$. The products from pyrolysis and gasification consist of solid phase, a gas phase and a liquid phase, i.e., tar.

As used herein tar shall in accordance with the terminology of refinery art be understood as a heavy hydrocarbonaceous liquid. Terms such as pyrolysis oil, coal tar and coke oven tar may be used to indicate the source of the tar. For the purpose of the present application tar is typically a product of pyrolysis, coke production or coal gasification. Tar is characterized by a high presence of heteroatoms (especially nitrogen, sulfur and oxygen) as well as a high content of aromatics. Typical parameters of tar include the hydrocarbonaceous liquid being a hydrocarbon mixture comprising from 0.5%, or 1% to 5%, 6% or 10% oxygen, having a density higher than 0.90 g/ml, higher than 0.96 g/ml, higher than 1.05 g/ml, having a ratio between nitrogen atoms and sulfur atoms (N:S) above 1:1, 2:1, 5:1 or 10:1, having a hydrogen content below 10% w/w and having an acid number above 2 or 4 and below 7 or 8 mgKOH/g.

The present disclosure is not limited to tar, but also to other hydrocarbonaceous liquid comprising a high amount of oxygen, such as animal fats, vegetable oils and tall oils, comprising up to 25% oxygen and having a high acidity.

In a broad sense the present disclosure refers to a process for extraction of metals from a hydrocarbon mixture obtained from a gasification or pyrolysis process, comprising the steps of combining said hydrocarbon mixture with an aqueous acid forming a mixture, mixing said mixture, separating said mixture in a contaminated aqueous phase and a purified hydrocarbon phase, with the associated benefit of said aqueous acid being able to release metals bound in such gasification and pyrolysis processes.

One embodiment of the disclosure in a process for producing a hydrotreated hydrocarbon from a hydrocarbon mixture obtained from a gasification or pyrolysis process or from an oxygenate mixture of biological origin, said hydrocarbon mixture having a acidity number above 1.5 mg KOH/g, 2 mg KOH/g or 4 mg KOH/g, comprising the steps of a. combining said hydrocarbon mixture with an aqueous acid forming a mixture,
b. mixing said mixture,
c. separating said mixture in a contaminated aqueous phase and a purified hydrocarbon phase
d. combining said purified hydrocarbon phase with a gas rich in hydrogen forming a hydroprocessing stream,
e. directing said hydroprocessing stream to a hydroprocessing step forming a hydrotreated hydrocarbon, with the associated benefit of such a process being that in the treatment of a hydrocarbon mixture having a high acidity number, such as above 1.5 mg KOH/g, 2 mg KOH/g or 4 mg KOH/g, the materials to be used in the equipment must be increasingly corrosion resistant. Therefore the addition of aqueous acid and subsequent removal of the aqueous phase will not pose an additional requirement to downstream process equipment, as the remaining acid will be negligible compared to the acidity of the hydrocarbon mixture.

In a further embodiment the hydrocarbon mixture comprises from 0.5%, or 1% to 5%, 6% or 10% oxygen, with the associated benefit of said aqueous acid being especially well suited to release metals related with oxygenates, such as such a phenols, naphthenol, naphthenic acids, and cresols.

In a further embodiment the aqueous acid is taken from the group comprising strong mineral acids or organic acids, preferably citric acid, oxalic acid, hydrochloric acid, phosphoric acid, phosphoric acid or sulfuric acid with the associated benefit of such acids of providing a strong chelating effect for withdrawing metals from said hydrocarbon phase, and specifically for citric acid, oxalic acid, and sulfuric acid that these acids are conveniently removed in downstream refinery processes.

In a further embodiment the process does not comprise addition of an aqueous liquid comprising elements other than C, H, O, N and S in a concentration above 0.1%, with the associated benefit of avoiding the addition of elements which are not removed by routine refinery processes.

In a further embodiment the concentration of the aqueous acid is from 1% or 2% to 5%, 10% or 30%, with the associated benefit of such an acid concentration of balancing a moderate corrosivity on process equipment against a high reactivity against bound metals.

In a further embodiment the ratio of hydrocarbon mixture to acid is from 20:1, 10:1, 50:1 to 2:1, 1:1 or 1:2, with the associated benefit of such a ratio being balanced between a high ability to withdraw metals, and a moderate increase in process volume.

In a further embodiment the temperature in step b is from 20° C. to 150° C., with the associated benefit of reducing the viscosity of the hydrocarbon mixture at elevated temperatures, and breaking the emulsion stability, thus permitting the separation into a purified hydrocarbon phase and an aqueous phase.

In a further embodiment the acid number in the mixture is above 2 or 4 and lower than 7 or 8 mg KOH/g), with the associated benefit of such an acidity matching that of the typical hydrocarbon mixture.

In a further embodiment the acid number in the hydrocarbon mixture is lower than 7 mg KOH/g, 8 mg KOH/g, 25 mg KOH/g or 150 mg KOH/g, with the associated benefit of a hydrocarbon mixture with an acid number of 7 mg KOH/g, 8 mg KOH/g, 25 mg KOH/g or 150 mg KOH/g being processable by regular refinery methods, if proper consideration of materials is made. Typically tars will have an acidity from 2 mg KOH/g to 8 mg KOH/g, biological oils and fats will have an acidity from 6 mg KOH/g to 15 mg KOH/g and fatty acids, such as crude tall oil may have an acidity from 100 mg KOH/g to 150 mg KOH/g.

In a further embodiment said hydroprocessing step (e) involves contacting the hydroprocessing stream with one or more catalytically active materials being active in one or more reactions taken from the group of hydrogenation of heteroatomic hydrocarbons, hydrogenation of diolefins and hydrogenation of metallic heteroatomic hydrocarbons, wherein each of said one or more materials may be present in the one or more reactors, wherein any sequence of said one or more materials may be used and wherein the pressure, temperature and space velocity are such that the catalytically active materials are active for the appropriate reactions, with the associated benefit of providing means well known in the refinery industry for reducing the acidity of the hydroprocessing stream, while other requirements for treatment of the hydroprocessing stream are met at the same time. Typically the material catalytically active in hydrogenation of diolefins will operate at an average temperature from 150° C. to 200° C. and the material catalytically active in hydrogenation of metals and other heteroatoms will operate at 280° C. to 400° C., preferably 300° C. to 360° C., the pressure may be from 2.5 MPa to 20 MPa, preferably 6 MPa to 10 MPa, the liquid hourly space velocity may be between 0.2 hr$^{-1}$ and 5 hr$^{-1}$, and the hydrogen to hydrocarbon ratio between 100 and 2000 Nm$^3$/m$^3$, but as it is well known to the skilled person these conditions will be interdependent and may vary depending on the specific materials chosen.

In a further embodiment an amount of said hydrotreated hydrocarbon is withdrawn and recycled as a recycle stream to a position upstream the point of withdrawal, in a hydrocarbon mixture:recycle stream ratio from 1:½ to 1:3, with the associated benefit of diluting the hydroprocessing stream, or a derivative of the hydroprocessing stream, which will reduce the temperature increase from exothermal hydrogenation and reduce the corrosiveness of the hydroprocessing stream.

In a further embodiment the process further comprises a hydrocracking step (f), optionally comprising a further hydrotreatment step and a separation step (g) providing a vapor product and one or more liquid hydrocarbon products, wherein the hydrocracking step (f) is operated at a temperature between 330° C. and 420° C., a pressure between 1.5 MPa, 6 MPa or 10 MPa and 20 MPa, a liquid hourly space velocity between 0.2 hr-1 and 5 hr-1, and a hydrogen to hydrocarbon ratio between 100 and 2000 Nm$^3$/m$^3$, with the associated benefit of such a hydrocracking step converting the hydrotreated hydrocarbons from boiling at high temperatures to a lower boiling range, with increase commercial value, such as naphtha and middle distillate, which may be obtained after a separation step. Furthermore if recycle is used it is beneficial to withdraw the recycle upstream the high pressure hydrocracking step, since this will reduce the volume of the high pressure equipment. Typically the material catalytically active in hydrogenation of diolefins will operate at an average temperature from 150° C. to 200° C. and the material catalytically active in hydrogenation of metals and other heteroatoms will operate at 280° C. to 400° C., preferably 300° C. to 360° C., and the pressure may be from 2.5 MPa to 20 MPa, preferably 6 MPa to 10 MPa.

In a further embodiment the process further comprises the step upstream step (a) of gasifying a carbonaceous material, forming a said hydrocarbon having an acid number above 1.5 mg KOH/g, with the associated benefit of providing a process for converting a carbonaceous material into a number of useful products, including hydrotreated hydrocarbons.

In a further embodiment the process further comprises a step of transporting an intermediate from one geographical location to another, wherein said intermediate is either said hydrocarbon having an acid number above 1.5 mg KOH/g or said hydrotreated hydrocarbon, with the associated benefit of providing a process in which a stabilized intermediate product is produced approximate to a coke oven, and transported to a refinery plant for subsequent conversion into a commercially attractive product.

A further aspect of the present disclosure is a process plant for production of a purified hydrocarbon from a tar feedstock comprising an acid wash reactor having one or more inlets in fluid communication with a tar feedstock inlet and with an acid inlet and having an outlet, a means for phase separation having an inlet, a aqueous phase outlet, and a purified hydrocarbon phase outlet, characterized in the outlet of said acid wash reactor being in fluid communication with the inlet of said means for phase separation, with the associated benefit of such a process plant being suited for removal of metals from hydrocarbon mixtures originating from tar.

In a further embodiment the process plant further comprises a gasifier or pyrolysis section having a solid carbonaceous fuel inlet, a water inlet and an oxidant inlet, a synthesis gas outlet and a tar outlet, wherein said tar outlet is in fluid communication with said feedstock inlet, with the associated benefit of such a process plant providing an efficient means for conversion of a solid carbonaceous fuel to a purified hydrocarbon.

In a further embodiment the process plant further comprises a gas cleaning section receiving a gas comprising CO, $H_2$ and $SO_2$, having an inlet, a desulfurized synthesis gas outlet and a sulfuric acid production section having a sulfur source inlet and a sulfuric acid outlet, wherein said sulfuric gas outlet is in fluid communication with said sulfur source inlet, said sulfuric acid outlet is in fluid communication with said acid inlet and said tar outlet is in fluid communication with said feedstock inlet, with the associated benefit of such a process plant having a minimal requirement for external supplies for demetallization since the required acid is supplied from the process plant.

In a further embodiment said means for phase separation is taken from the group comprising centrifuges, electrostatic separators, gravity separators, with the associated benefit related to centrifuges being a highly efficient separation, and the associated benefit related to of gravity separators being a low cost.

In a further embodiment the process plant comprises a hydrotreatment section, having an inlet and an outlet, with the inlet of said hydrotreatment section being in fluid connection with the outlet of said purified hydrocarbon phase outlet, with the associated benefit of such a process plant being highly compatible with the regular processes in a refinery.

In a further embodiment said process plant comprises a hydrocracking section, having an inlet and an outlet, with the inlet of said hydrocracking section being in fluid connection with the outlet of said outlet of the hydrotreater section, with the associated benefit of such a process plant providing the possibility to produce a wide range of attractive hydrocarbons from a heavy contaminated hydrocarbon mixture.

The removal of metals from hydrocarbon mixtures is an important process step, since the presence of metals may result in large problems in the refinery plant. Specifically guard beds for capturing metals may be costly, and may have high pressure drops when metal has been captured on the materials. Therefore, a process which does not sequester metals in the process but which is able to withdraw them, is desired.

It is known to add acids for removal of metals from hydrocarbon mixtures, but typically the removal has been found to be most efficient at neutral or close to neutral conditions to avoid acidification of the product, since this will result in a risk of corrosion of equipment and in addition most refinery products have specifications limiting the acid number. However, coke oven tars, pyrolysis oils and renewable fats and oils typically have high acid numbers (2 to 8 mg KOH/g), and thus these products are handled in equipment made from corrosion resistant materials. Therefore a pretreatment step by contact with aqueous acid solutions to remove metal contaminants will not change the processability of the product significantly or change the selection of construction material for the reactors, vessels and other equipment, as considerations of corrosiveness are made in the field of refineries for feeds with acid number above 0.5 mg KOH/g and that feeds with acid number above 1.0, 1.5 or 2.0 mg KOH/g are considered corrosive, and require special and focused attention in process design and/or selection of materials.

During hydrotreating, the acid number/acidity is reduced/eliminated as acidic compounds, e.g., naphthenic acids, phenols, naphthalenols, are converted.

In coke oven tars and pyrolysis oil the amount of metals may typically be 200-500 wt ppm and in fats and oils of renewable origin the amounts may also be in the level of hundreds of ppm wt. Most of these metals are in the form of soluble compounds, which cannot be removed by mechanical filtration.

The addition of acid to the hydrocarbon mixture is, without being bound by theory, believed to release the metals present as complexes with phenol or other organic groups (e.g., naphthenic acids), followed by withdrawal of the metals by chelation with the acid.

In order to prepare the product for further processing the aqueous acid phase must be removed. This may be done by a variety of practical means, such as mixer/settlers, centrifuges, electrostatic precipitators and gravity separators.

An associated benefit of the acid wash demetallization process is that the content of total and basic nitrogen compounds in the hydrocarbon mixture is reduced, thereby reducing the $NH_3$ and organic nitrogen inhibition to the hydrotreatment and particularly to the hydrocracking catalysts. This implies a reduction of the required catalyst(s) volume and a lower hydrogen consumption.

The choice of acid for acid wash of tar depends on a number of aspects. An important aspect is of course the ability to scavenge metals, which is related to the chelation ability of the acid and the strength of the acid. In addition the compatibility of the acid with downstream refining processes is important. From this aspect sulfuric acid has the benefit that any sulfuric acid remaining entrained in the hydrocarbon as well as bisulfate and sulfate anions will be easily removed in the downstream hydrodesulfurization processes together with the removal of organic sulfur and hydrogen sulfide. Similarly organic acids will also be compatible with downstream processes, whereas phosphoric or hydrochloric acid may further aggravate the poisoning effect of phosphorus and chloride or even contaminate the downstream processes with elements which would otherwise not be present in the hydrocarbon feed.

In the processing of tar the viscosity of the tar is also important. Some tars are highly viscous and may benefit from being processed at temperatures around 80° C., whereas other tars may be less viscous, and therefore are processable at lower temperatures.

The process must also be designed in consideration of the feed conditions. If tar is directly obtained from upstream pyrolysis or gasification, it is likely that the tar may have to be cooled in order to be processed with a liquid phase of aqueous acid, whereas in a process where tar is processed from storage the tar may have to be heated to be processable.

FIGURES

Figure 1:
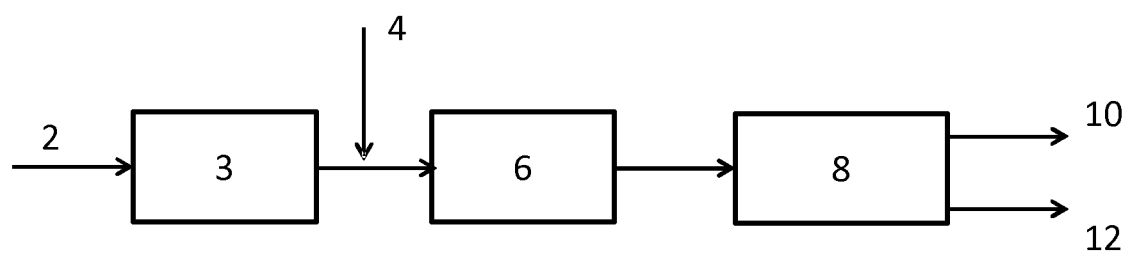
FIG. 1 shows a schematic process layout corresponding to the present disclosure.

In the figures the following elements are referred to:
2 Hydrocarbon mixture
3 Heater 4 Aqueous acid solution
6 Mixing reactor
8 Means of phase separation
10 Contaminated aqueous phase
12 Purified hydrocarbon phase
14 Stream rich in hydrogen
16 Hydrotreater reactor
18 Metal guard bed
20 Material catalytically active in hydrotreating
22 Hydrotreated product stream
24 Gas/liquid separator
26 Hydrotreated hydrocarbon
28 Vapor stream
30 Acid gas removal section
32 Hydrogen sulfide rich stream
34 Recycle gas stream
36 Make up hydrogen
42 Sulfur dioxide rich stream
44 Sulfur dioxide converter
46 Sulfur dioxide oxidation
48 Sulfur trioxide rich stream
50 Sulfuric acid producing unit
52 Concentrated sulfuric acid
54 Water
100 Carbonaceous raw material
102 Solid product
104 Gaseous effluent
106 Tar
108 Waste gas
110 Gas rich in $SO_2$
112 Tar
114 Sulfuric acid
116 Demetallized tar
118 Hydrotreated purified hydrocarbons
120 Oven
122 Gas cleaner
124 Tar condensation
126 Sulfuric acid section
128 Demetallization section
130 Hydrotreater section
132 Gas cleaning
600,700 Carbonaceous raw material
602,702 Solid carbonaceous coke
604,704 Gaseous effluent
606,706 Liquid tar
610,710 Contaminated aqueous phase
612,712 Sulfuric acid
614,714 Purified hydrocarbon phase
616,716 Heavy residue
618,718 Purified hydrocarbon for processing
620,720 Stream for hydroprocessing
624,724 Stream rich in hydrogen
648,748 Gas stream rich in hydrogen
634,734 recycled hydrotreated product
622,722 Conditioned stream
626,726 Demetallized hydrocarbon
628,728 Hydrotreated product stream
632,732 Hydrotreated hydrocarbon
630 Vapor stream 638,738 Hydrotreated hydrocracker feed
640,739 Hydrocracked product 642,742 Lube
644,744 Middle distillate
646,746 Naphtha
660,760 Coke oven
668,768 Metal guard
670,770 Hydroprocessing reactor
662,762 Demetallization section
672,772 Gas/liquid separator
674,774 Pump
676,678,778 Hydrotreatment reactors
680,780 Hydrocracking reactor
682,782 Fractionator
730 Bottoms stream
740 Hydrocracked hydrocarbons
770,788 Compressor In FIG. 1 a simple form of the present disclosure is shown. A hydrocarbon mixture 2, comprising oxygenates and metals is optionally heated in 3, and is together with an aqueous acid solution 4 directed to a mixing reactor 6, in which mixing takes place. The mixture is directed to a means of phase separation 8, from which a contaminated aqueous phase 12 and a purified hydrocarbon phase 10 is withdrawn.

The specific design of the mixing reactor 6 may be chosen from a wide range of possibilities and similarly the separation may be carried out in gravitational means, a centrifuge, electrostatic separators or another means of separation. A centrifuge will be more expensive, and have an operational cost, but the benefit in increased separation efficiency may outweigh these costs.

Figure 2:
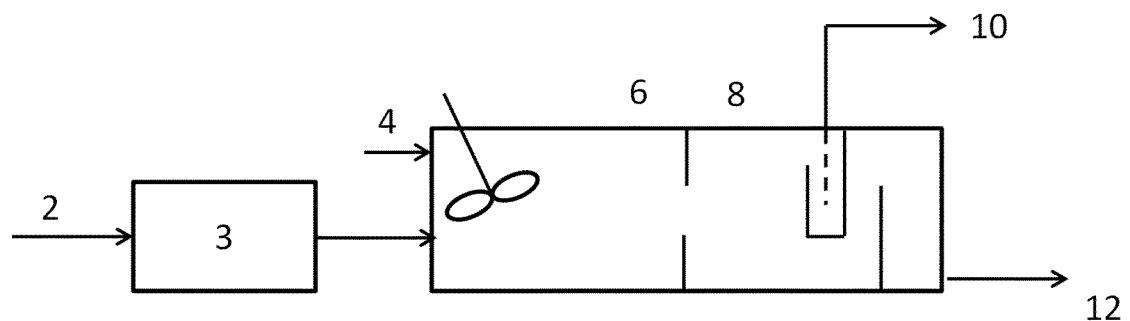
FIG. 2 shows a process layout corresponding to the present disclosure.

In FIG. 2 the process is shown to be carried out in a combined mixer-separation of the mixer settler type, in which the phase separation is by in a simple gravitational settling. The hydrocarbon mixture 2 comprising oxygenates and metals is optionally heated in 3, and is together with the aqueous acid solution 4 directed to a mixer settler type device with a mixing reactor 6, in which mixing takes place. The mixture is directed to a means of separation 8 which here is a settler in which the phase separation is effectuated by a simple gravitational settling. A contaminated aqueous phase 12 and a purified hydrocarbon phase 14 are withdrawn from the settler.

Figure 3:
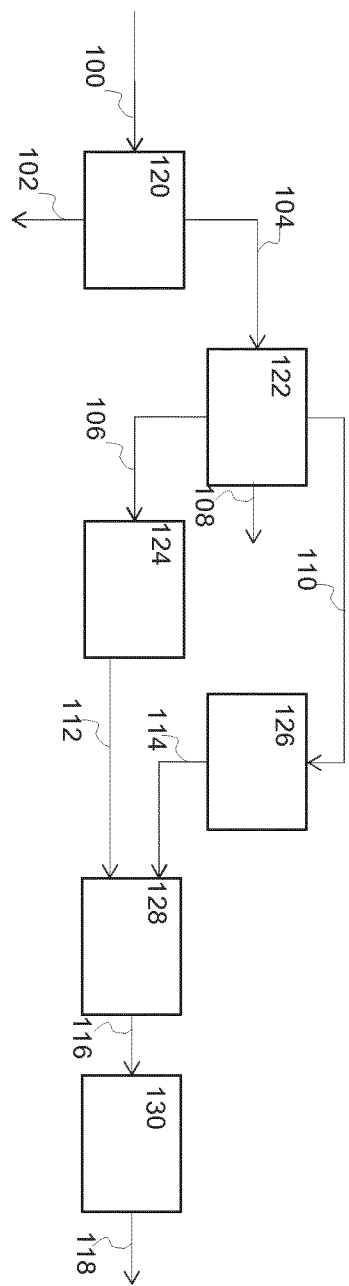
FIG. 3 shows a conceptual integrated process plant layout for a coke oven and tar processing plant, involving the present disclosure.

In FIG. 3 an integrated process plant layout for a coke oven and tar processing plant, involving the present disclosure is shown, without specific details (and omitting side streams). In the production of coke and tar a carbonaceous raw material 100 is directed to a coke oven 120, and solid carbonaceous coke 102 and gaseous effluent 104 is withdrawn. The gas cleaned in 122 and tar 106, waste gas 108 and a sour gas rich in $SO_2$ 110 is withdrawn. The tar 106 is cooled and directed to tar condensation 124, and a liquid tar 112 is withdrawn. The gas rich in $SO_2$ 110 is treated in a sulfuric acid section 126 (which may be of the wet or dry type) and sulfuric acid 114 is produced. Liquid tar 112 and sulfuric acid 114 are directed to demetallization section 128, from which demetallized tar 116 is withdrawn and directed to a hydrotreater section 130, from which hydrotreated purified hydrocarbons 118 are withdrawn.

A similar process layout would also be applicable for production of pyrolysis oil from biomass as the carbonaceous raw material. Here the solid product 102 from the pyrolysis oven 120 would typically be waste and the specific gas cleaning 132 in a pyrolysis process may be different from that of a coke oven process, but the overall configuration would be very similar.

Figure 4:
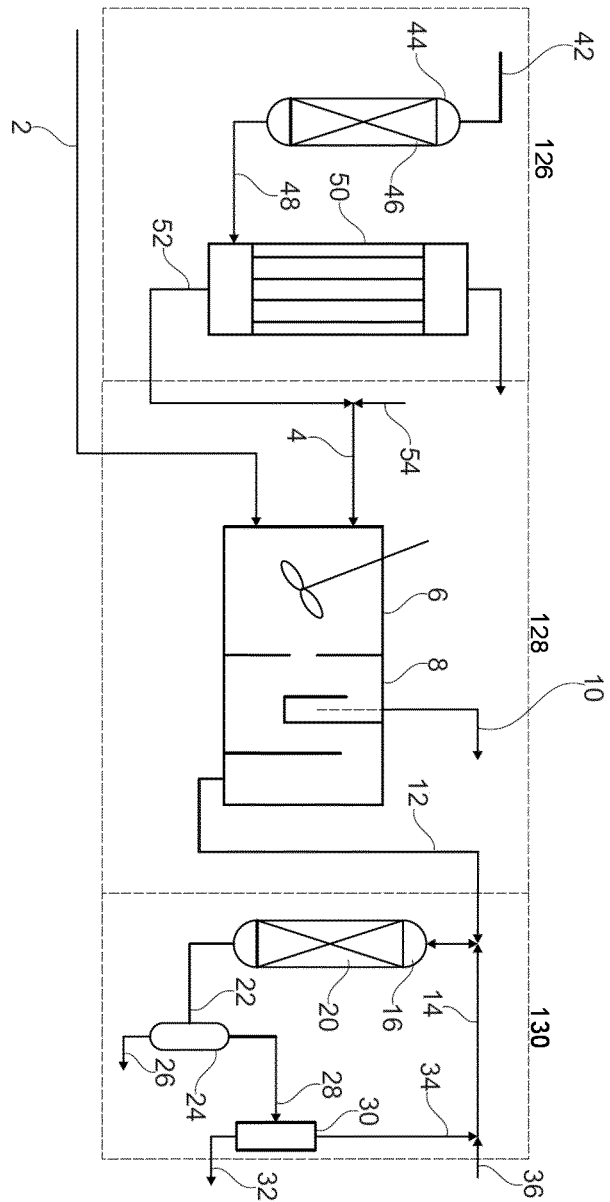
FIG. 4 shows an integrated process plant layout corresponding to the present disclosure.

In FIG. 4 a specific integrated process plant layout corresponding to the present disclosure is shown in more detail. In a demetallization section 128, a hydrocarbon mixture 2 comprising oxygenates and metals such as tar, and an aqueous acid 4 are directed to a mixing reactor 6, in which mixing takes place, with a defined residence time. The mixture is directed to a means of phase separation 8, from which a contaminated aqueous phase 10 and a purified hydrocarbon phase 12 is withdrawn. In a subsequent hydrotreater section 130, the purified hydrocarbon is mixed with a stream rich in hydrogen 14 and directed to a hydrotreater reactor 16, comprising a material catalytically active in hydrotreating 20, as it is well known to the skilled person. From the hydrotreater reactor a hydrotreated product stream 22 is withdrawn. The hydrotreated product stream 22 is separated in a gas/liquid separator 24 or optionally a cascade of separators into a hydrotreated (and thus desulfurized) hydrocarbon 26 and a vapor stream 28. The vapor stream 28 is directed to an acid gas removal section 30, including e.g. an amine scrubber which separates the vapor stream 28 into a hydrogen sulfide rich stream 32, and a recycle gas stream 34. Make up hydrogen 36 is added to the recycle gas stream 34, to provide the stream rich in hydrogen 14. In a sulfuric acid production section 126, the sulfur dioxide from a coke oven optionally in combination with incinerated $H_2S$ and regenerated spent acid is provided as a sulfur dioxide rich stream 42. This stream is directed to a sulfur dioxide converter 44, containing a material catalytically active in sulfur dioxide oxidation 46, in which sulfur dioxide is oxidized to sulfur trioxide, providing a sulfur trioxide rich stream 48, which is directed to a sulfuric acid producing unit 50, which may be either a condenser, condensing hydrated sulfur trioxide into concentrated sulfuric acid 52 or which may be an absorber absorbing sulfur trioxide in sulfuric acid, providing concentrated sulfuric acid 52. Typically water 54 is added to the concentrated sulfuric acid 52 produced, but this may be omitted if the sulfuric acid has an appropriate concentration.

As it is well known to the skilled person a number of configurations of the hydrotreater section 130 are possible, in which separation is carried out in other ways, in which more reactors are present or in which make up hydrogen is added in different positions. Similarly the sulfuric acid section 126 may be configured in multiple ways; the stream rich in hydrogen sulfide may be pre-concentrated by removal of water, $CO_2$ and other constituents, the oxidation of hydrogen sulfide may take place in high temperature incineration or at moderate temperature catalytic oxidation, the sulfuric acid production may be a so-called dry process, in which water is removed from the sulfur dioxide rich stream 42. This process is typically related to the use of an absorber as the sulfuric acid producing unit 50. If the sulfuric acid producing unit 50 is of the condenser type, water may have to be added upstream the condenser, to enable hydration of sulfur trioxide to sulfuric acid. Typically water 54 is added to the concentrated sulfuric acid 52 produced.

In alternative embodiments the contaminated aqueous phase 10 collected may also optionally in combination with the hydrogen sulfide rich stream 32 be directed to an incinerator (not illustrated), together with an appropriate support fuel and an oxidant, and combusted under formation of a.o. $SO_2$, which may be combined with stream 42.

The contaminated aqueous phase 10 may also be recycled and combined with aqueous sulfuric acid 4 as make up sulfuric acid. In this case a purge stream could be withdrawn and directed for regeneration as combustion of spent acid.

Figure 5:
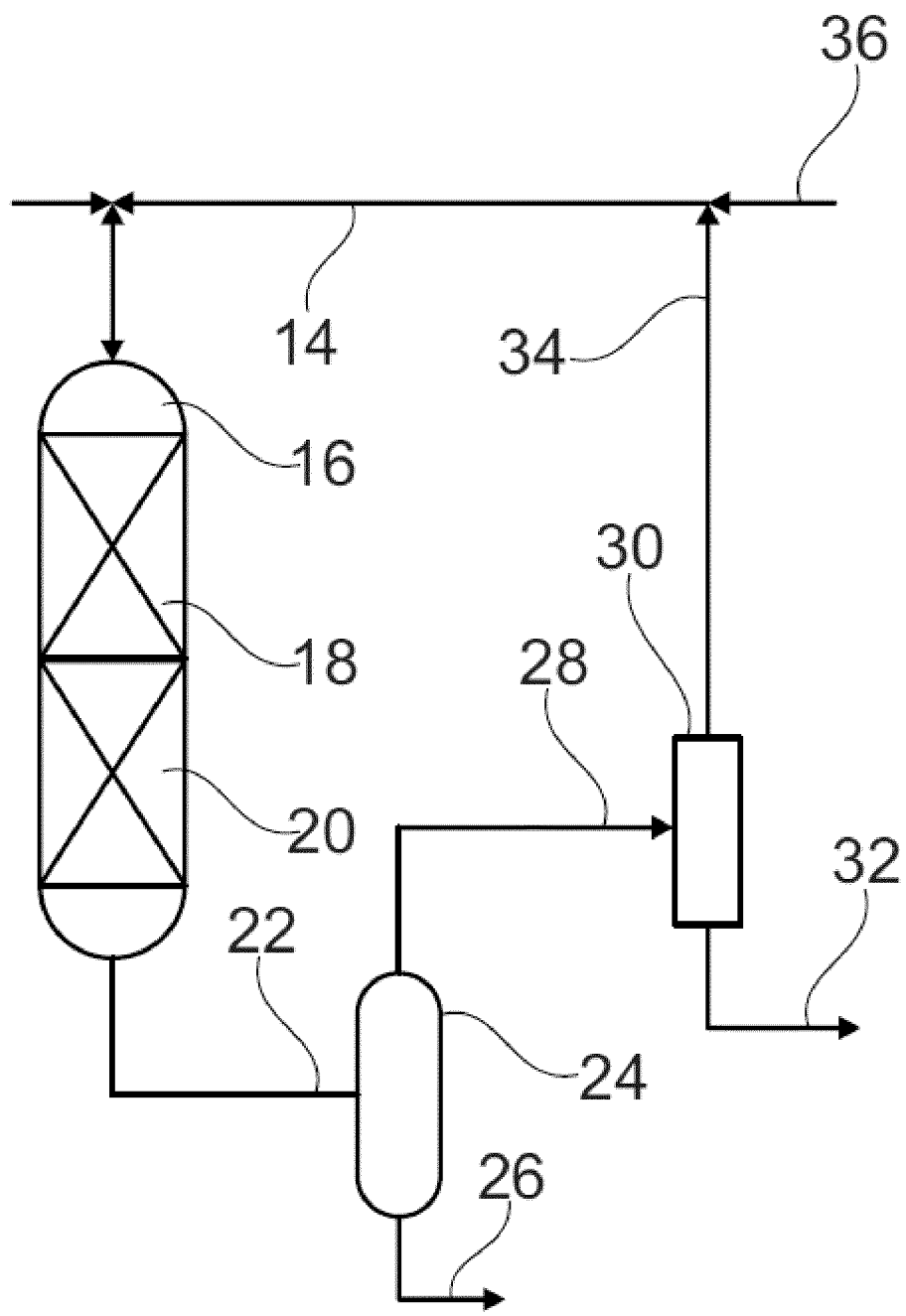
FIG. 5 shows a process for demetallization by hydrotreating, according to the prior art.

FIG. 5 shows an embodiment according to the prior art, in which demetallization is carried out in a hydrotreater section. Here the hydrocarbon mixture 2 is mixed with a stream rich in hydrogen 14 and directed to a hydrotreater reactor 16, comprising a metal guard bed 18 and a material catalytically active in hydrotreating 20, as it is well known to the skilled person. From the hydrotreater reactor a hydrotreated product stream 22 is withdrawn. The hydrotreated product stream 22 is separated in a gas/liquid separator 24 into a hydrotreated hydrocarbon 26 (which is thus desulfurized and demetallized) and a vapor stream 28. The vapor stream 28 is directed to an acid gas removal section 30, including e.g. an amine scrubber which separates the vapor stream 28 into a hydrogen sulfide rich stream 32, and a recycle gas stream 34. Make up hydrogen 36 is added to the recycle gas stream 34, to provide the stream rich in hydrogen 14. Compared to the hydrotreater section of FIG. 2, a separate metal guard bed 18 is required. This could be implemented by two guard bed reactors in swing mode upstream a main reactor.

Figure 6:
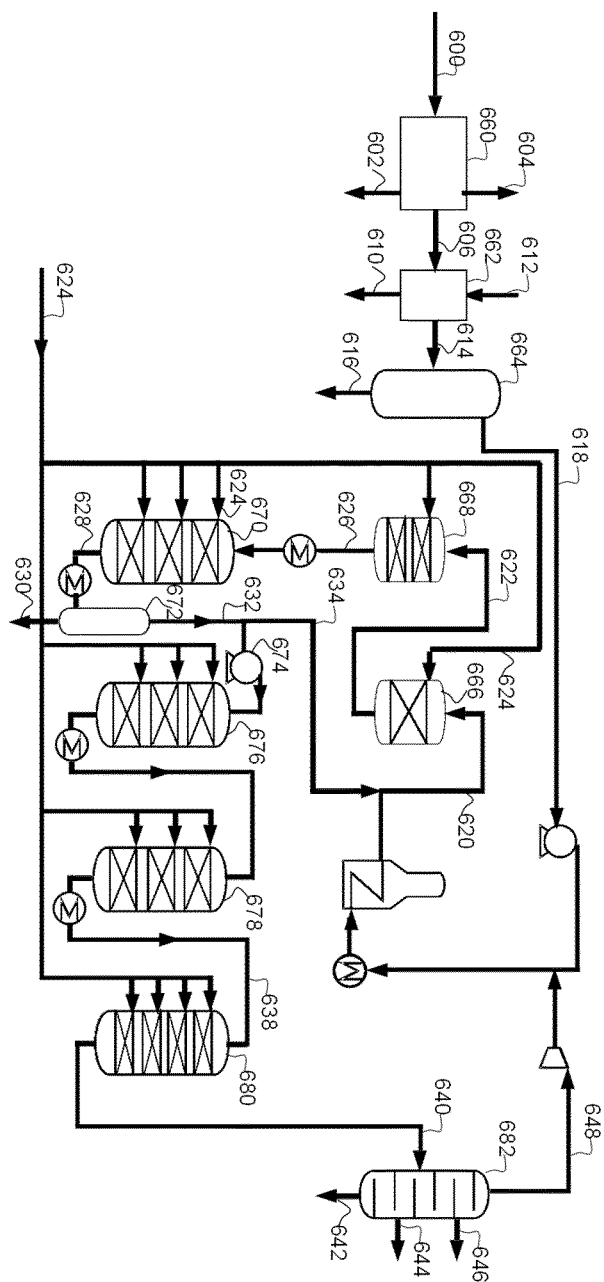
FIG. 6 shows a process plant layout for a coke oven and tar processing plant, involving the present disclosure.

FIG. 6 shows a process plant layout for a coke oven and tar processing plant, involving the present disclosure. A carbonaceous raw material 600 is directed to a coke oven 660, and solid carbonaceous coke 602 optionally in combination with a feed of air to the oven, a gaseous effluent 604 and a liquid tar hydrocarbon mixture 606 are withdrawn. The liquid tar hydrocarbon mixture 606 and sulfuric acid 612 are directed to demetallization section 662, from which a contaminated aqueous phase 610 and a purified hydrocarbon phase 614 is withdrawn. Optionally a heavy residue 616 may be withdrawn from the purified hydrocarbon 614, providing a purified hydrocarbon for processing 618.

The purified hydrocarbon for processing 618 is combined with a gas stream rich in hydrogen 648, heated, and optionally combined with a stream of recycled hydrotreated product 634, forming a stream for hydroprocessing 620. The stream for hydroprocessing 620 is directed to an optional diolefin guard reactor 666, in which diolefins may be saturated in a material catalytically active in diolefin saturation. In the diolefin guard reactor 666, a quench stream rich in hydrogen 624 is added. The quench stream is a make-up hydrogen gas, but may also be a recycled and purified hydrogen rich gas. The streams upstream the addition of recycled hydrotreated product 634 will all have a high TAN value (above 1.5 mg KOH/g) and thus be corrosive and therefore the equipment must be made from corrosion resistant materials. If recycle is used, the equipment downstream the addition of the recycled hydrotreated product 634 may be of lower corrosion resistance due to the dilution by the recycle. Furthermore the use of recycle has the benefit of providing thermal mass, and thus reducing the temperature increase in the process. The diolefin saturation is highly exothermal, so the conditioned stream 622 will have a higher temperature, but it may still be required to heat the stream further by heat exchange (not shown). The conditioned stream 622 is directed to an optional metal guard reactor 668, containing a material catalytically active in hydrogenation having a high metal capture capability, for withdrawal of remaining metallic heteroatoms from the conditioned stream 622, providing a demetallized hydrocarbon stream 626. In a subsequent hydroprocessing reactor 670, the demetallized hydrocarbon stream 626 is mixed with a stream rich in hydrogen 624, and a hydrotreated product stream 628 is withdrawn. The hydrotreated product stream 628 is separated in a gas/liquid separator 672 or optionally a cascade of separators into a hydrotreated (and thus desulfurized) hydrocarbon 632 and a vapor stream 630, comprising hydrogen, water, ammonia and hydrogen sulfide. A fraction of the hydrotreated hydrocarbon 632 may be directed as optional recycle 634 to be combined with the purified hydrocarbon stream for processing 618.

The remainder of the hydrotreated hydrocarbon is pressurized by pump 674, before being hydrotreated further by contact with a material catalytically active in hydrotreatment in hydrotreatment reactors 676 and 678, providing a hydrotreated hydrocracker feed 638, The hydrotreated hydrocracker feed 638 is directed to contact a material catalytically active in hydrocracking in hydrocracking reactor 680.

The hydrocracked product 640 will have a wider boiling point range that the hydrocracker feed 638, and thus the feed will be directed to a fractionator 682, from which lube 642 boiling above 350° C., middle distillate 644 boiling from 150° C. to 350° C., naphtha 646 boiling below 150° C. and a vapor phase stream rich in hydrogen 648 boiling below 30° C. may be withdrawn. The vapor phase may optionally be purified by means well known to the skilled person, compressed and directed as a gas stream rich in hydrogen 648 for being combined with the purified hydrocarbon 618.

In further embodiments the separation process may be implemented in different ways known to the skilled person, either by a simplified gas liquid separation or by the addition of a cascaded high pressure hot separator and a low pressure hot separator prior to the fractionator.

In a further embodiment the hydrotreated stream 638 may also be directed to the fractionator 682, and only e.g. a heavy stream similar to 644 boiling in the middle distillate range may be withdrawn and directed to reactor 680 containing material catalytically active in hydrocracking. This configuration may especially be attractive where middle distillates are not the primary product.

In alternative embodiments pump 674 may be omitted and the hydrotreatment section (reactors 666, 668 and 670) and the hydrocracking section (reactors 676, 678 and 680) may operate at similar pressures.

In further alternative embodiments the number of reactors may be different, and a single reactor may contain material catalytically active in different reactions.

Further alternative embodiments involve the transport of an intermediate product from one plant to another, which, with reference to FIG. 6, may involve the liquid tar hydrocarbon mixture 606, the purified hydrocarbon mixture 614, the purified hydrocarbon mixture for hydroprocessing 618, the conditioned hydrocarbon 622, the demetallized hydrocarbon 626 or the hydrotreated hydrocarbon 628. The transport may be conducted by pipeline or by tanker vehicle.

Figure 7:
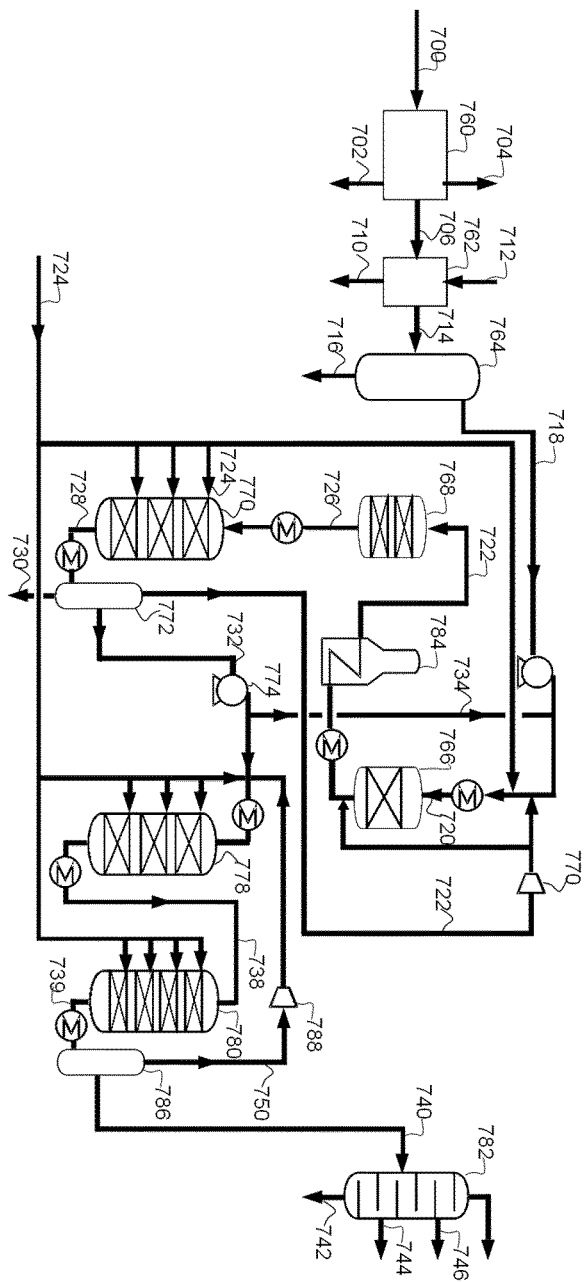
FIG. 7 shows a process plant layout for a coke oven and tar processing plant, involving the present disclosure.

FIG. 7 shows a process plant layout for a coke oven and tar processing plant, involving the present disclosure. A carbonaceous raw material 700 is directed to a coke oven 760, and solid carbonaceous coke 702 optionally in combination with a feed of air to the oven, a gaseous effluent 704 and a liquid tar hydrocarbon mixture 706 are withdrawn. The liquid tar hydrocarbon mixture 706 and sulfuric acid 712 are directed to demetallization section 762, from which a contaminated aqueous phase 710 and a purified hydrocarbon phase 714 is withdrawn. Optionally a heavy residue 716 may be withdrawn from the purified hydrocarbon 714, providing a purified hydrocarbon for processing 718.

The purified hydrocarbon for processing 718 is combined with a gas stream rich in hydrogen 722, heated, and optionally combined with a stream of recycled hydrotreated product 734, forming a stream for hydroprocessing 720. The stream for hydroprocessing 720 is directed to an optional diolefin guard reactor 766, in which diolefins may be saturated in a material catalytically active in diolefin saturation. In the diolefin guard reactor 766, a stream rich in hydrogen 724 is added upstream the reactor and possibly as quench in the reactor (not shown). The quench stream can be a make-up hydrogen gas or a recycled hydrogen rich gas. The streams upstream the addition of recycled hydrotreated product 734 will all have a high TAN value (above 1.5 mg KOH/g) and thus be corrosive and therefore the equipment must be made from corrosion resistant materials. If recycle is used, the equipment downstream the addition of the recycled hydrotreated product 734 may be of lower corrosion resistance due to the dilution by the recycle. Furthermore the use of recycle has the benefit of providing thermal mass, and thus reducing the temperature increase in the process. The diolefin saturation is highly exothermic, so the conditioned stream 722 will have a higher temperature, but it may still be required to heat the stream further by an optional fired heater 784 and/or by heat exchange. The conditioned stream 722 is directed to an optional metal guard reactor 768, containing a material catalytically active in hydrogenation having a high metal capture capability, for withdrawal of remaining metallic heteroatoms from the conditioned stream 722, providing a demetallized hydrocarbon stream 726. In a subsequent hydroprocessing reactor 770, the demetallized hydrocarbon stream 726 is mixed with a stream rich in hydrogen 724, and a hydrotreated product stream 728 with reduced organic nitrogen is withdrawn. The hydrotreated product stream 728 is separated in a gas/liquid separator 772 or optionally in a cascade of separators into a hydrotreated (and thus denitrogenated and desulfurized) hydrocarbon 732, a sour water stream 730 and a vapor stream 722, comprising hydrogen, and hydrogen sulfide. A fraction of the hydrotreated hydrocarbon 732 may be directed as optional recycle 734 to be combined with the purified hydrocarbon stream for processing 718.

The remainder of the hydrotreated hydrocarbon 732 is pressurized by pump 774, before being hydrotreated further by contact with a material catalytically active in hydrotreatment in hydrotreatment reactor 778, providing a hydrotreated hydrocracker feed 738, The hydrotreated hydrocracker feed 738 is directed to contact a material catalytically active in hydrocracking in hydrocracking reactor 780.

The hydrocracked product 739 will comprise two phases, and a gas liquid separator 786 is used to separate a vapor phase 750 for recycle (after optional removal of sour gases) from a liquid phase 740. The liquid phase 740 will have a wider boiling point range that the hydrocracker feed 738, and thus the feed will be directed to a fractionator 782, from fractions such as lube 742 boiling above 350° C., middle distillate 744 boiling from 150° C. to 350° C., naphtha 746 boiling below 150° C. and a vapor phase stream 748 boiling below 30° C. may be withdrawn.

In further embodiments the separation process may be implemented in different ways known to the skilled person, either by a simplified gas liquid separation or by the addition of a cascaded high pressure hot separator and a low pressure hot separator prior to the fractionator.

In a further embodiment the hydrotreated stream 738 may also be directed to the fractionator 782, and only e.g. a heavy stream similar to 744 boiling in the middle distillate range may be withdrawn and directed to reactor 780 containing material catalytically active in hydrocracking. This configuration may especially be attractive where middle distillates are not the primary product.

In alternative embodiments pump 774 may be omitted and the hydrotreatment section (reactors 766, 768 and 770) and the hydrocracking section (reactors 778 and 780) may operate at similar pressures. As the skilled person will realize, operation at similar pressures may simplify operation in requiring only a single gas loop, but the operational optimization of hydrotreatment and hydrocracking may also be more challenging.

In further alternative embodiments the number of reactors may be different, and a single reactor may contain material catalytically active in different reactions.

Further alternative embodiments involve the transport of an intermediate product from one plant to another, which, with reference to FIG. 7, may involve the liquid tar hydrocarbon mixture 706, the purified hydrocarbon mixture 714, the purified hydrocarbon mixture for hydroprocessing 718, the conditioned hydrocarbon 724, the demetallized hydrocarbon 726 or the hydrotreated hydrocarbon 728. The transport may be conducted by pipeline or by tanker vehicle.

FIGS. 6 and 7 are presented for explanatory illustration only, and show a number of process elements which are not described in the text above, such as heat exchangers, pumps and quench addition of hydrogen rich gas, as well as additional means of separation and gas purification. Fewer or additional of such elements may be required or omitted in the actual implementation of the present invention and the drawing shall therefore not be considered a narrow illustration of the limitations of the invention.

EXAMPLES

In Table 1 the composition of two examples of coke oven tar is shown. Both examples contain high amounts of oxygen, sulfur and nitrogen, but also the content of metals (Ca, Fe, Mg) is quite high.

Example 1

The capability for removal of Fe. Mg and Ca from coke oven tar was evaluated experimentally for a number treatments, including the acids. citric acid, oxalic acid, hydrochloric acid, phosphoric acid, phosphoric acid, phosphoric acid and sulfuric acid.

Table 2 summarizes the experimental procedure and results. All experiments involved heating a coke oven tar to 80° C. and either filtering it directly or combining it with water or acid (having the concentration "Acid wt %") in a defined water or acid:to tar mass ratio (Aq:Tar w/w) ratio. The removal of metals varied significantly. Whilst 60-95% Ca was removed by filtration and 60% Mg was removed by water washing, Fe was only significantly removed by acid wash, and Ca and Mg removal efficiency was also increased by acid wash.

In experiments with of concentrated acids (15-28 wt %) citric acid, oxalic acid, phosphoric and to some extent hydrochloric acid were efficient in removal of metals. When the concentration (1-5%) was reduced, phosphoric acid and sulfuric showed good removal efficiency, which however was reduced at 1% acid concentration compared to 5%.

Table 3 summarizes the effect of acid wash with phosphoric acid and sulfuric acid upon the presence of nitrogen. It is clearly seen that both acids remove nitrogen from the tar, but that especially sulfuric acid is able to remove basic nitrogen.

In addition the level of phosphorous in the feed was measured to be below 1 ppm, the level of phosphorous in the tar treated with 5% phosphoric acid was measured to 2390 ppm and the level of phosphorous in the tar treated with 5% sulfuric acid remained below the detection limit of 1 ppm. This demonstrates the value of using an acid such as sulfuric acid containing only elements well known in refinery processes, since any residue of sulfuric acid would be removed in a downstream hydrotreatment, whereas 2390 ppm phosphorous would result in poisoning to the catalytically active materials, The experiments confirm that a wide range of acids may be used for highly effective demetallization of coke oven tar at moderate temperatures and moderate acid concentrations.

Example 2

Table 4 shows the conditions for a hydroprocessing process as shown in FIG. 7. The process receives "Coal tar 3" of Table 1 as feedstock, either in a comparative configuration with demetallization by the hydrotreatment (a base case with absence of acid wash 762 and with high capacity in hydrodemetallization 768) or in a configuration according to the present disclosure with active acid wash (acid wash case with demetallization in 764 and low capacity in hydrodemetallization 768). In both cases the pilot test was conducted on coal tar 706 which was collected remotely in a configuration where the separator 764 was omitted.

Example 2 is based on a combination of the experiment of Example 1, demonstrating acid wash, a further experiment demonstrating hydrodemetallization and hydroprocessing of coal tar and chemical reaction modelling combining these experimental results, demonstrating the effect of hydroprocessing acid washed tar. The experiments were carried out in a pilot plant simulating the configuration of FIG. 7, by conducting hydrodemetallization in a first experiment using the commercial demetallization catalysts TK-743T and TK-49T from Haldor Topsøe NS. In the specific example temperature was controlled by externals means, and recycle was omitted. In addition all hydrogen was present at the inlet to the reactors. The product of demetallization was fed to a hydrotreatment/hydrocracking pilot reactor containing the commercial hydrotreatment catalyst TK-609T from Haldor Topsøe NS and the commercial hydrocracking catalyst TK-951T from Haldor Topsøe NS.

Table 4 shows that for the acid wash case only 20% volume of demetallization catalyst is required. The amount of demetallization catalyst was defined by a required run-time of 2 years, Since the acid wash also removes nitrogen, the catalyst volume of the high pressure hydrotreater—which is designed from the required denitrogenation capacity—can be reduced to 25% of the base case. In addition the lower amount of ammonia (which is a hydrocracking catalyst poison) released in the high pressure hydrotreatment reactor, makes it possible to reduce the volume of the hydrocracking catalyst by 33% while having the same hydrocracker conversion. The boiling curve of the product shows a large amount of naphtha, but should it be desired to produce a higher amount of middle distillate, the hydrocracker conditions may quite freely be altered to provide less naphtha, or alternatively only a part of the intermediate product 738 may be directed to the final hydrocracking reactor, while the remainder is directed to the fractionator 782.

The example shows that the presented acid wash process is able to remove metals and some feed nitrogen and that a number of benefits are obtained from removing the metals in an upstream acid wash since the required capacity for metal removal and for hydrodenitrogenation are reduced.

TABLE 1

| Sample Name | Method | Coal Tar 1 | Coal Tar 2 | Coal Tar 3 |
|---|---|---|---|---|
| O, wt % | DB | 8.1 | 7.1 | 7.11 |
| S, wt % | D 4294 | 0.1569 | 0.1709 | 0.2155 |
| N, wt ppm | D 4629 | 6026 | 6075 | 5787 |
| H, wt % | D 7171 | 9.41 | 9.46 | 9.54 |
| C, wt % | By Difference | 82.3 | 83.3 | 82.5 |
| SG 60/60° F. | D 4052 | 1.006 | 1.003 | 1.0002 |
| N Basic, wt ppm | titration | 3573 | 4233 | 3764 |
| Metals, wt ppm | | | | |
| Calcium | ICP-OES | 103 | 210 | 226 |
| Iron | ICP-OES | 78 | 110 | 128 |
| Magnesium | ICP-MS | 3.2 | 8.2 | 4.1 |
| Total acid number, | D 664 | 6.3 | 4.5 | 5.4 |

TABLE 1-continued

| Sample Name | Method | Coal Tar 1 | Coal Tar 2 | Coal Tar 3 |
|---|---|---|---|---|
| mg KOH/g | | | | |
| Carbon Residue, wt % | D 4530 | 4.92 | 5.12 | 5.91 |
| Simulated Distillation | D 7213 | | | |
| 0.5 wt % (IBP), ° C. | D 7213 | 151 | 132 | 155 |
| 5 wt %, ° C. | D 7213 | 196 | 192 | 196 |
| 10 wt %, ° C. | D 7213 | 221 | 220 | 220 |
| 30 wt %, ° C. | D 7213 | 288 | 286 | 288 |
| 40 wt %, ° C. | D 7213 | 318 | 316 | 318 |
| 50 wt %, ° C. | D 7213 | 349 | 344 | 349 |
| 60 wt %, ° C. | D 7213 | 378 | 372 | 378 |
| 70 wt %, ° C. | D 7213 | 405 | 401 | 406 |
| 90 wt %, ° C. | D 7213 | 475 | 471 | 476 |
| 95 wt %. ° C. | D 7213 | 511 | 509 | 513 |
| 99.5 wt % (FBP), ° C. | D 7213 | 590 | 588 | 588 |

TABLE 2

| | Acid, wt % | Aq:Tar w/w | Removal Ca | Fe | Mg |
|---|---|---|---|---|---|
| Filtration | | | 60-95% | 0-11% | 0-8% |
| Water Wash | 0 | 2:1 | 19% | 24% | 60% |
| Citric acid | 27.8 | 2:1 | 100% | 82% | 99% |
| Oxalic acid | 15.3 | 2:1 | 100% | 76% | 99% |
| Hydrochloric acid | 26.4 | 2:1 | 71% | 75% | 75% |
| Phosphoric acid | 23.1 | 2:1 | 100% | 100% | 100% |
| Phosphoric acid | 5.0 | 1:1 | 97% | 94% | >69% |
| Phosphoric acid | 1.0 | 1:1 | 75% | 62% | >69% |
| Sulfuric acid | 5.0 | 1:1 | 94% | 92% | >69% |
| Sulfuric acid | 1.0 | 1:1 | 78% | 74% | >69% |

TABLE 3

Denitrogenation.

| | Untreated tar | Tar treated with H3PO4 1 wt % | Tar treated with H3PO4 5 wt % | Tar treated with H2SO4 1 wt % | Tar treated with H2SO4 5 wt % |
|---|---|---|---|---|---|
| N, wt ppm | 5970 | 4811 | 4213 | 3811 | 3157 |
| N Basic, wt ppm | 3682 | 2897 | 2463 | 2044 | 1326 |
| Denitrogenation of total N | | 19% | 29% | 36% | 47% |
| Denitrogenation of basic N | | 21% | 33% | 44% | 64% |

TABLE 4

| Stream # | Property | Base case | Acid wash |
|---|---|---|---|
| 706 | Feed N | 5970 | 5970 |
| 706 | Metals | >350 ppm | >350 ppm |
| 706 | TAN | 5.4 | 5.4 |
| 718 | Feed N | 5970 | 3157 |
| 718 | Metals | >350 ppm | <20 ppm |
| 718 | TAN | 5.4 | 5-6 |
| 718 | Product b.p. | | |
| 718 | IBP-150° C. | 0% | 0% |
| 718 | 150-260° C. | 21% | 21% |
| 718 | 260-390° C. | 44% | 44% |
| 718 | >390° C. | 36% | 36% |
| 768 | Relative cat.vol. | 100% | 20% |
| 768 | LHSV | 0.80 | 4.0 |
| 726 | Prod N | 5300 | 3083 |
| 726 | Metals | <20 ppm | <20 ppm |
| 726 | TAN | <5 | <5 |
| 726 | Product b.p. | | |
| 726 | IBP-150° C. | 2% | 2% |
| 726 | 150-260° C. | 19% | 19% |
| 726 | 260-390° C. | 45% | 45% |
| 726 | >390° C. | 34% | 34% |
| 770 | Relative cat.vol. | 100% | 100% |
| 770 | LHSV | 1.4 | 1.4 |
| 728 | Prod N | 2905 | 1690 |
| 728 | Product b.p. | | |
| 728 | IBP-150° C. | 4% | 4% |
| 728 | 150-260° C. | 27% | 27% |
| 728 | 260-390° C. | 45% | 45% |
| 728 | >390° C. | 23% | 23% |
| 778 | Relative cat.vol. | 100% | 25% |
| 778 | LHSV | 0.47 | 1.89 |
| 738 | Prod N | 23 | 23 |
| 738 | Product b.p. | | |
| 738 | IBP-150° C. | 10% | 10% |
| 738 | 150-260° C. | 35% | 35% |
| 738 | 260-390° C. | 40% | 40% |
| 738 | >390° C. | 16% | 16% |
| 738 | Rel. NH3 | 100% | 58% |
| 780 | Rel cat.vol. | 100% | 66.75% |
| 780 | LHSV | 0.61 | 0.91 |
| 780 | Temperature | 390° C. | 390° C. |
| 740 | IBP-150° C. | 22% | 22% |
| 740 | 150-260° C. | 24% | 24% |
| 740 | 260-390° C. | 39% | 39% |
| 740 | >390° C. | 15% | 15% |

The invention claimed is:

1. A process for producing a hydrotreated hydrocarbon from a hydrocarbon mixture obtained from a gasification or pyrolysis process or from an oxygenate mixture of biological origin, said hydrocarbon mixture having an acidity number above 1.5 mg KOH/g, comprising the steps of:
   a. combining said hydrocarbon mixture with an aqueous acid forming a mixture,
   b. mixing said mixture,
   c. separating said mixture in a contaminated aqueous phase and a purified hydrocarbon phase,
   d. combining said purified hydrocarbon phase with a gas rich in hydrogen forming a hydroprocessing stream, and
   e. directing said hydroprocessing stream to a hydroprocessing step forming a hydrotreated hydrocarbon,
   wherein the process does not comprise a step of addition of an aqueous liquid comprising elements other than C, H, O, N and S in a concentration above 0.1% such that neither the aqueous acid, nor any other aqueous additive, would comprise other elements than C, H, O, N or S above 0.1%.

2. The process according to claim 1, in which the hydrocarbon mixture comprises from 0.5% to 10% oxygen.

3. The process according to claim 1 according to which the aqueous acid is taken from strong mineral acids or organic acids.

4. The process according to claim 1, according to which concentration of the aqueous acid is from 1% to 30%.

5. The process according to claim 1, according to which hydrocarbon mixture is combined with acid in a ratio from 20:1 to 1:2.

6. The process according to claim 1, according to which step b is carried out at a temperature from 20° C. to 150° C.

7. The process according to claim 1, according to which the hydrocarbon mixture has an acid number lower than 150 mg KOH/g.

8. The process according to claim 1, in which said hydroprocessing step (e) involves contacting the hydroprocessing stream with one or more catalytically active materials being active in one or more a reactions taken from the group of hydrogenation of heteratomic hydrocarbons, hydrogenation of diolefins and hydrogenation of metallic heteratomic hydrocarbons, wherein each of said one or more catalytically active materials may be present in the one or more reactors, wherein any sequence of said one or more materials may be used and wherein pressure, temperature and space velocity are selected such that the catalytically active materials are active for the appropriate reactions.

9. The process according to claim 1, in which an amount of said hydrotreated hydrocarbon is withdrawn and recycled as a recycle stream to a position upstream the point of withdrawal, in a hydrocarbon mixture:recycle stream ratio from 1:½ to 1:3.

10. The process according to claim 1, further comprising a hydrocracking step (f) after said hydroprocessing step (e), optionally comprising a further hydrotreatment step and a separation step (g) after said hydrocracking step (f) providing a vapour product and one or more liquid hydrocarbon products, wherein the hydrocracking step (f) is operated at a temperature between 330° C. and 420° C., a pressure between 1.5 MPa and 20 MPa, a liquid hourly space velocity between 0.2 hr-1 and 5 hr-1, and a hydrogen to hydrocarbon ratio between 100 and 2000 Nm3/m3.

11. A process according to claim 1, further comprising a step upstream step (a) of gasifying a carbonaceous material, forming a said hydrocarbon having an acid number above 1.5 mg KOH/g.

12. A process according to claim 11, further comprising a step of transporting an intermediate from one geographical location to another, wherein said intermediate is either said hydrocarbon having an acid number above 1.5 mg KOH/g or said hydrotreated hydrocarbon.

13. The process according to claim 1, wherein said hydrocarbon mixture has an acidity number above 2 mg KOH/g.

14. The process according to claim 1, wherein said hydrocarbon mixture has an acidity number above 4 mg KOH/g.

15. A process plant for production of a purified hydrocarbon from a tar feedstock comprising:
   a. an acid wash reactor having one or more inlets in fluid communication with a tar feedstock inlet and with a acid inlet and having an outlet,
   b. a means for phase separation having an inlet, a aqueous phase outlet, and a purified hydrocarbon phase outlet,
   c. a gasifier or pyrolysis section having a solid carbonaceous fuel inlet, a water inlet and optionally an oxidant inlet, a synthesis gas outlet and a tar outlet,
   wherein the outlet of said acid wash reactor is in fluid communication with the inlet of said means for phase separation, and
   wherein said tar outlet is in fluid communication with said tar feedstock inlet.

16. The process plant according to claim 15, further comprising d. a gas cleaning section receiving a gas comprising CO, H2 and SO2, having an inlet, a desulfurized synthesis gas outlet and a sulfuric gas outlet e. a sulfuric acid production section having a sulfur source inlet and a sulfuric acid outlet, wherein said sulfuric gas outlet is in fluid communication with said sulfur source inlet, said sulfuric acid outlet is in fluid communication with said acid inlet and said tar outlet is in fluid communication with said tar feedstock inlet.

17. The process plant according to claim 16 wherein said means for phase separation is taken from the group comprising centrifuges, electrostatic separators, gravity separators.

18. The process plant according to claim 15, comprising a section for hydrotreatment, having an inlet and an outlet, with the inlet of said section for hydrotreatment being in fluid connection with the outlet of said purified hydrocarbon phase outlet.

19. The process plant according to claim 18 comprising a section for hydrocracking, having an inlet and an outlet, with the inlet of said section for hydrocracking being in fluid connection with the outlet of said outlet of the section for hydrotreatment.

* * * * *